United States Patent Office 3,355,278
Patented Nov. 28, 1967

3,355,278
HERBICIDAL COMPOSITION AND METHOD
Edward D. Weil, Lewiston, and Jerome Linder, Niagara Falls, N.Y., assignors to Hooker Chemical Corporation, Niagara Falls, N.Y., a corporation of New York
No Drawing. Filed Mar. 27, 1964, Ser. No. 355,498
19 Claims. (Cl. 71—94)

This application is a continuation-in-part of copending application Ser. No. 95,001, filed Mar. 13, 1961, now abandoned.

This invention is concerned with new and improved herbicidal methods employing substituted 2-pyridones.

More particularly we have found that the growth of undesired plants, i.e., weeds, can be repressed or prevented by applying to the site of said plants an effective amount of at least one 2-pyridone of the structure

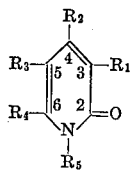

wherein $R_1$, $R_2$, $R_3$, and $R_4$ are selected from the group consisting of halogen, hydrogen, lower hydrocarbyl, lower hydrocarbyloxy, hydroxy, amino, substituted amino, preferably lower hydrocarbylamino, nitro, carboxyl, carboxymethyl, and, in the case of adjacent groups, the termini of a fused carbocyclic ring containing a total of from 5 to 8 carbon atoms, at least one of $R_1$, $R_2$, $R_3$ and $R_4$ is halogen and wherein $R_5$ is selected from the group consisting of hydrogen, a metal cation, an ammonium cation, a lower hydrocarbyl substituted ammonium cation, and a lower acyl group and, when at least one of $R_1$, $R_2$, $R_3$ and $R_4$ is amino or substituted amino, lower hydrocarbyl. By hydrocarbyl is meant a radical resulting from removal of a hydrogen atom from a hydrocarbon. By the term lower is meant having from one to about twelve carbon atoms inclusive. Where the substituent group is carboxyl, the carboxylate salts of said compounds are within the scope of the invention.

Representative compounds which, when used in accordance with the method of the invention are effective herbicides include 3-bromo-2-pyridone, 4-bromo-5-methyl-2-pyridone, 3-bromo-5-butyl-6-methyl-2-pyridone, 3-lauryl-6-iodo-2-pyridone, 5-allyl-3-bromo-6-methyl-2 - pyridone, 3-chloro-6-phenyl-2-pyridone, 3-chloro-6-naphthyl-2-pyridone, 3-chloro-4,5,6-trimethyl-2-pyridone, 3-chloro-6-cyclohexyl-2-pyridone, 3-chloro-6-methoxy-2-pyridone, 3,4,5 - trichloro-6-phenoxy-2-pyridone, 3-chloro-6-hydroxy-2-pyridone, 3-chloro-4-amino-2-pyridone, 3,5-dichloro-4,6-di(methylamino) - 2-pyridone, 3,5-dibromo-4,6-di(butylamino)-2-pyridone, 3-bromo-6-decylamino-2-pyridone, 3, 5 - dichloro-6-anilino-2-pyridone, 3,5-dichloro-6-α-naphthylamino-2-pyridone, 3-bromo-5-nitro-2-pyridone, 3-bromo - 2 - pyridone, 6-bromo-4-chloro-2-pyridone, 3,5-dichloro-4-carboxy-2-pyridone and the sodium carboxylate salt thereof, 3,4,5-trichloro-6-carboxy-2-pyridone and the potassium carboxylate salt thereof, 3-iodo-5,6-trimethylene - 2-pyridone, 3,5,6-trichloro-4-carboxymethyl-2-pyridone, 3-bromo-5,6-tetramethylene-2-pyridone, 3-bromo-5, 6 - hexamethylene-2-pyridone, 3,4-dichloro-5,6-benzo-2-pyridone, 3 - bromo-5,6-(1,1,3-trimethyl-1,2-dihydrobenzo)-2-pyridone, the sodium salt of 3-bromo-2-pyridone, the potassium, calcium iron, manganese, or zinc salt of 3-methyl-4-chloro-5,6-tetramethylene-2-pyridone, the ammonium salt of 6-methoxy-3,4,5-trichloro-2-pyridone, the methylammonium or dimethylammonium or trimethylammonium salts of 6-phenyl-3,4,5-trichloropyridone, the dimethyldodecylammonium salt of 5,6-benzo-3-chloro-2-pyridone, 1 - acetyl - 3-bromo-5,6-tetramethylene-2-pyridone, 1-methyacrylyl tetrachloro-2-pyridone, 1-benzoyl-3, 4-dichloro-2-pyridone, and 1-chloroacetyl-2-pyridone.

As with any large group of biologically active compounds, certain sub-groups are preferred because of maximal activity relative to cost, ease of synthesis and availability. Thus, certain preferred sub-groupings may be distinguished, viz.

(a) the tetrahalopyridones

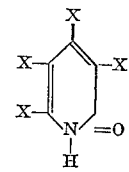

wherein X is an element selected from the group consisting of chlorine, bromine, fluorine and iodine, preferably chlorine, and the salts of these compounds.

These pyridones may exist as tautomers so that the compound of the illustrated formula may be designated as 3,4,5,6-tetrahalo-2-hydroxypyridine or by the alternative names 3,4,5,6-tetrahalo-alpha-pyridone; 3,4,5,6-tetrahalo-2-oxypyridine; 3,4,5,6-tetrahalo-2-pyridone; 3,4,5,6-tetrahalo-2-(1H)-pyridone; and 3,4,5,6-tetrahalopyridone-2. The tetrachloro compound is the preferred embodiment.

These compounds are moderately strong acids and react with bases of all sorts to give salts having the structure:

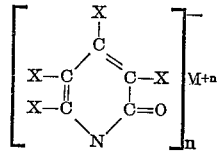

where X is an element selected from the group consisting of chlorine, bromine, fluorine and iodine, preferably chlorine and M is a cation and $n$ is the number of positive charges borne thereby. The above anion can exist in several mesomeric forms or may be a resonance hybrid thereof.

These salts of the tetrahalo-2-pyridones all retain the herbicidal activity of the parent acid in greater or lesser degree, and so may all be employed within the method of the invention. The salts will, however, differ in physical properties (solubility in particular), depending on the cationic moiety, and consequently, will be formulated, handled, and used in varying ways. For example, the alkali metal bases (oxides, hydroxides, carbonates, and bicarbonates for example, of sodium, potassium and lithium), yield sodium, potassium and lithium salts having high water solubility, which may be conveniently formulated and sprayed in water solution. The same is true for ammonia and the lower alkylamines and alkylaryl amines of less than about twelve carbon atoms. For example, water-soluble salts may be made with mono-, di-, and tri-alkyl amines where the alkyl groups are methyl, ethyl, propyl, butyl, 2-hydroxyethyl, 2-hydroxypropyl, also with cyclic amines such as piperidine, morpholine, N-methylmorpholine, N-ethylmorpholine, pyridine, picoline and collidines. Excluded are non-basic amines such as pyrrole and indole.

Salts of lesser water solubility, but still usable in water solution, or equally as well in dry formulations, are those of magnesium, calcium and ferric iron, and also of amines of more than twelve carbon atoms. In the latter group, the solubility diminishes as the number of carbon atoms increases, and it is convenient to use an alcohol such as ethanol as a co-solvent with water to aid in dissolving the salt. Suitable longer chain amine salts are triamyl, stearyl, and octadecyl amines, dimethyl lauryl amine, dimethyl coco amine, Armeens (commercial amines having mixed fatty alkyls derived from natural fats), and the like. These longer chain amine salts, toward some species of plants, show enhanced activity, perhaps due to enhanced penetration of the waxy leaf cuticle.

Salts of low water solubility, preferably used in dry formulation or wettable powders, include the heavy metal salts such as zinc, manganese, lead, nickel and copper salts. These are most useful in pre-emergence applications and may show longer soil persistence because of lower solubility.

Since all salts of a strong acid such as tetrahalo-2-pyridones can readily ionize, and in the presence of buffers, such as are present in the soil or plant fluids, can yield an equilibrium concentration of the free acid, they are included in the scope of the invention. Thus, the above-listed salts are meant only to be illustrative, not limiting.

(b) The aminohalopyridones of the structure

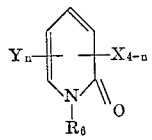

wherein X is halogen, Y is an amino radical unsubstituted or substituted by a covalent organic radical, $n$ is an integer from 1 to 2 inclusive, and $R_6$ is selected from the group consisting of hydrogen and a hydrocarbyl radical. If Y is substituted, it is preferably lower hydrocarbyl-substituted and when $R_6$ is hydrocarbyl, it is preferably lower hydrocarbyl. The X substituents need not be the same halogen. The preferred halogens are chlorine and bromine. The Y groups, which can be the same or different, include alkylamino, alkoxyamino, dialkylamino, alkenylamino, dialkenylamino, cycloalkylamine, phenylamino, naphthylamino, alkylphenylamino, halophenylamino, piperidino, pyrrolidino, morpholino, and alkoxyalkylamino. It is preferred that such radicals have 12 carbon atoms or fewer. The $R_6$ group includes hydrogen, alkyl, alkenyl, alkoxyalkyl, phenyl, alkylphenyl, phenylalkyl, halophenyl, naphthyl, and cycloalkyl. As in the case of Y, it is preferred that such radicals contain 12 carbon atoms or fewer. These compounds may be produced by the replacement of one or two halogen atoms of the corresponding tetrahalo-2-pyridone of the structure

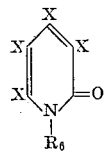

by means of one or two molar equivalents of an amine YH plus one or two molar equivalents, respectively, of a base. The base may be identical to YH or may be an inorganic basic substance such as caustic soda, soda ash, sodium acetate, or the like, or an organic base such as pyridine, triethylamine, dimethylaniline, or other tertiary amine. These replacement reactions are generally carried out in the liquid phase at from about 20° to 220° C. While the use of a solvent is not critical, it is convenient to employ a stable organic solvent such as benzene, toluene, methanol, ethanol, acetone, dimethylformamide, dimethylsulfoxide, pyridine, triethylamine, diisopropyl ether, dioxane, nitrobenzene or the like. These reactions generally take from about 10 minutes to several days depending on the temperature and on the nucleophilicity of the amine YH. The products, mostly colorless solids, are usable as herbicides in crude form or may be purified by recrystallization or other means.

The tetrahalopyridone starting materials may be produced by the methods described by Roedig and Märkl, Ann., 636, 1 (1960).

(c) The 2-pyridones of the structure

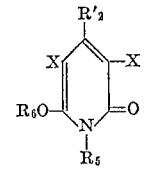

where $R'_2$ is lower hydrocarbylamino, X is halogen, preferably chlorine, and $R_6$ is hydrogen or lower hydrocarbyl, and $R_5$ is as defined above but is preferably hydrogen; and salts thereof.

This preferred sub-group is exemplified by 4-amino-3,5-dichloro - 6 - methoxy - 2 - pyridone, 4-ethylamino-3,5-dichloro - 6 - allyloxy-2-pyridone, 4-sec-butylamino-3,5-dichloro-5-benzyloxy-2-pyridone, and the sodium and other water soluble alkali metal, ammonium and hydrocarbyl substituted ammonium salts thereof.

(d) The 2-pyridones of the structure

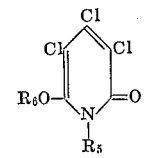

wherein $R_6$ and $R_5$ are as defined above, preferably where $R_5$ is hydrogen, and salts thereof.

These compounds are exemplified by 6-methoxy-trichloro-2-pyridone, 6-allyloxytrichloro-2-pyridone, and the sodium, ammonium, or lower alkylammonium salts thereof.

(e) The 2-pyridones of the structure

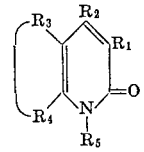

where $R_1$, $R_2$ and $R_5$ are as defined above, and $R_3$ and $R_4$ are, taken together, a carbocyclic bridge of from 3 to 6 carbon atoms (i.e. forming a fused ring of from 5 to 8 carbon atoms). Examples of herbicides in this group are 3,4-dichloro-5-6-benzo-2-pyridone, 3-bromo-5,6-tetramethylene-2-pyridone and the salts thereof.

The compounds discussed above, where $R_5$ is hydrogen or a cation may be capable of existing in a tautomeric form, wherein $R_5$ is on the carbonyl oxygen. In solution it is thought that the two forms are in equilibrium and it is only by arbitrary choice that the compounds discussed herein are described as being in the tautomeric form depicted, use of the other tautomer being encompassed in the method of the invention.

There is considerable latitude and variation possible with the invented plant growth control method. The pyridones may be applied directly on weeds or crops to be defoliated or desiccated, which is a post-emergence use. It may be applied to the soil for use as a preemergent herbicide. The compound may be applied in various states of purity ranging from crystals to technical crude. It may be formulated either in solution or as a mixture with solvents. Suitable solvents include alcohols, aqueous alcohol solutions, ketones, including acetone or methyl isobutyl ketone, and petroleum hydrocarbons such as xylene.

Where solid formulations are desired the herbicides may be applied on a granular, powdered, or pelleted carrier such as clay, vermiculite, mica, diatomaceous earth, talc or fertilizer, etc. Frequently, the easily prepared less water-soluble salts such as those of the alkaline earth and heavy metals may be used more expeditiously in this type of formulation. Calcium and zinc salts have been found to be satisfactory in such formulations.

Many times it may be desired to prepare water formulations of the herbicides, or as in the case of dry formulations, relatively insoluble forms of the herbicides. If this is the case, the pyridones, especially the 3,4,5,6-tetrahalo-α-pyridones may be converted to salts having the desired solubility or formulation characteristics by reacting the compound with a suitable base. Generally, suitable bases are the alkali metal bases or ammonia amines. Particularly suitable salt-forming bases include sodium, lithium, potassium, calcium, magnesium, ammonium and zinc hydroxides, carbonates and their bicarbonates, where available. Additionally, the alkylamines, dialkylamines, trialkylamines, aromatic and heterocyclic amines are valuable for this purpose particularly those structures possessing from five to eight carbon atoms. Illustrative amines that may be used include ethyl, propyl, butyl, amyl, 2-hydroxyethyl amines, morpholine, N-methyl or N-ethylmorpholine, amines made from coconut oil, lauryl amines, aniline, N-methyl aniline, N,N-dimethyl aniline, pyridines, picolines, etc. Where it is desired to make up a water formulation from a base having over eight carbons the addition of a lower alcohol co-solvent will give homogeneous solutions in water.

The formulations may include wetting agents, emulsifying or dispersing agents, sequestrants, colorants, odorants, anti-foaming agents and other adjuvants. They may also contain other herbicides such as 2,4-D, aminotriazole, herbicidal oils, sodium trichloroacetate, polychlorobenzoic acids, and the like, to complement, supplement, enhance, or synergize the activity of the herbicide of the invention.

The rates of application of the active pyridones will generally vary between the range of about one-eighth to 100 pounds per acre, dependent upon whether the use is pre- or post-emergence, or for defoliation or for soil sterilization. Obviously, even within a given use, there will be variations depending upon the type of crop treated, the type of soil, economics and climatic conditions. Where the herbicide is intended to be used to kill weed seedlings at an early stage of development, when they are most susceptible, the range may be one-quarter to ten pounds per acre. Similarly, in defoliation of crops, where total kill of the plant is not desired, a range of one-eighth to fifteen pounds per acre has been found to be satisfactory, while for especially recalcitrant weed species or mature weed plants or soil sterilization, fifteen to thirty-five pounds per acre is a useful range of the rate of application. Finally, if total sterilization for extended periods of time is the aim, then rates from thirty-five to fifty pounds per acre and up even to 100 pounds per acre are most practical.

In the examples which follow, non-limiting illustrations of the formulations and use of the 2-pyridones and formulations containing such a herbicide as an active ingredient are given.

*Example 1*

An aqueous formulation of tetrachloro-α-pyridone is made as follows:

| | Parts by weight |
|---|---|
| Tetrachloro-α-pyridone | 23.3 |
| Sodium hydroxide | 4.0 |
| Or trimethylamine | 5.0 |
| Water | 72.7 |

The ingredients are blended to make a clear aqueous solution. To prevent precipitation by hard water, one percent of the sodium salt of ethylenediaminetetraacetic acid may also be added. To favor wetting of foliage, five precent of sodium dodecylnaphthalene-sulfonate may also be added.

*Example 2*

An organic solvent solution of tetrachloro-α-pyridone is made as follows:

| | Parts by weight |
|---|---|
| Tetrachloro-α-pyridone | 1 |
| Butanol | 9 |

The active ingredient dissolves to make a solution sprayable as such or emulsifiable in water by the further addition of 0.5 part by weight of a suitable emulsifier.

*Example 3*

A wettable powder dispersion of tetrachloro-α-pyridone is made as follows:

| | Parts by weight |
|---|---|
| Tetrachloro-α-pyridone | 50 |
| Microcel E (inert siliceous carrier) | 44.3 |
| Marasperse (ligninsulfonate dispersant) | 5 |
| Sorbit P (alkylarylsulfonate wetting agent) | 0.7 |

The ingredients are ground together to make a powder dispersable in water.

*Example 5*

Pre-emergence tests of tetrachloro-α-pyridone are made as follows:

The chemical in formulation as in Example 1 is applied at the rate of four and eight pounds of active ingredient per acre to the soil surface in a test area seeded with millet, lambsquarters, ragweed, and buttonweed. Several weeks later, when these weeds had emerged from an untreated control area, essentially one hundred percent control is observed in the treated area.

*Example 6*

Post-emergence tests of tetrachloro-α-pyridone are made as follows: The chemical in a formulation as in Example 2 is sprayed at the rates of one-half, one, two and four pounds per acre to an area in which were growing alfalfa, millet, ragweed, lambsquarters, and buttonweed. At two pounds per acre and above, all species were killed. At one-half pound and one pound per acre, the major observed effect was desiccation of the alfalfa and millet.

*Examples 7–17*

The following tabulation of examples gives the evaluation of some representative salts of tetrachloro-2-pyridone as pre-emergence herbicides at four pounds per acre, using the procedure outlined in Examples 5 and 6.

| Ex. | Salts Used | Control | |
|---|---|---|---|
| | | Pre-Emergence | Post-Emergence |
| 7 | Sodium | Complete control | Complete control. |
| 8 | Potassium | do | Do. |
| 9 | Lithium | do | Do. |
| 10 | Calcium | do | Do. |
| 11 | Monomethylamine | do | Do. |
| 12 | Dimethylamine | do | Do. |
| 13 | Triethylamine | do | Do. |
| 14 | Monobutylamine | do | Do. |
| 15 | 2-hydroxypropylamine | do | Do. |
| 16 | N-methylmorpholine | do | Do. |
| 17 | Stearylamine | do | Do. |

As the foregoing data indicates, essential one hundred percent control as pre-emergence and post-emergence herbicides are observed.

It is to be understood that the above salts may be applied, formulated and treated in the same manner as the tetrachloro-α-pyridone itself.

*Example 18*

A mixture of 0.05 gram-mole of N-phenyltetrachloro-2-pyridone and 0.2 gram mole of dimethylamine in 50 cc. of ethanol was heated in a sealed glass pressure vessel at 100° C. for 36 hours. Then the mixture was evaporated to dryness, the solid residue heated with benzene, filtered, the benzene filtrate evaporated, and the residue recrystallized from benzene-heptane mixture to obtain bis(dimethylamino)dichloro-N-phenyl-2-pyridone as a colorless solid, melting at 138–138.5° C.

*Analysis.*—Calculated for $C_{15}H_{17}Cl_2N_3O$: Cl, 21.9%; N, 12.9%. Found. Cl, 21.5%; N, 12.5%.

*Example 19*

The above process was conducted, using 0.1 gram mole of dimethylamine. The product, recrystallized from aqueous ethanol, was a colorless solid, melting at 167–8° C., and had the correct analysis for (dimethylamino)trichloro-N-phenyl-2-pyridone.

*Analysis.*—Calculated for $C_{13}H_{12}Cl_3N_2O$: Cl, 33.5%; N, 8.8%. Found: Cl, 33.0%; N, 8.3%.

*Example 20*

The process of Example 18 was conducted, using 0.1 gram mole of methylamine. The product, recrystallized from benzene, melted at 208–210° and had the correct analysis for (methylamino)trichloro-N-phenyl-2-pyridone.

*Analysis.*—Calculated for $C_{12}H_9Cl_3N_2O$: Cl, 35.2%. Found: Cl, 34.7%.

*Example 21*

The process of Example 18 was repeated using 0.1 gram mole of ammonia. The reaction mixture was filtered. The solids were washed with water and the insoluble portion was recrystallized to obtain a colorless solid, of melting point 233° C. (decomposition occurs). The original filtrate was diluted with water. The solids thus precipitated were filtered out and recrystallized from benzene to obtain colorless crystals, melting at 194–6° C. Both products had the correct analysis for aminotrichloro-N-phenyl-2-pyridone and are considered to be position isomers.

*Example 22*

A mixture of 0.05 gram mole of N-phenyltetrachloro-2-pyridone, 0.1 mole of morpholine, and 200 cc. of ethanol was refluxed for 36 hours, then evaoprated to dryness. The residue was boiled with benzene, filtered, and the benzene filtrate was evaporated. The solid residue was triturated with water and was again filtered. The crude solid product was recrystallized twice from benzene to obtain a colorless crystalline solid, melting at 175–177° C., having the correct analysis for the morpholinotrichloro-2-pyridone.

*Analysis.*—Calculated for $C_{15}H_{13}Cl_3N_2O_2$: Cl, 29.7%; N, 7.8%. Found: Cl, 29.3%; N, 7.7%.

*Example 23*

A mixture of 0.1 gram mole of N-isopropyltetrachloro-2-pyridone, 0.4 gram mole of ammonia, and 100 cc. of ethanol was heated at 100° C. in a closed pressure vessel for 36 hours. The reaction mixture was evaporated to dryness, leached with water and then triturated with cold benzene. The insoluble product, melting at 155–7° C., had a reasonably correct analysis for the diamino-dichloro-2-pyridone.

*Analysis.*—Calculated for $C_8H_9Cl_3N_2O$: Cl, 41.9%; N, 10.95%. Found: Cl, 41.0%; N, 11.3%.

In a similar manner, other aminotrihalo-2-pyridones are produced by reaction of 1 molar equivalent of a tetrahalo-2-pyridone and 2 molar equivalents of an amine, as follows:

| Example | Amine | Pyridone | Product |
|---|---|---|---|
| 24 | Ethylamine | N-methyl-tetrachloro-2-pyridone | Ethylaminotrichloro-N-methylpyridone. |
| 25 | Isopropylamine | do | Isopropylaminotrichloro-N-methylpyridone. |
| 26 | Diethylamine | do | Diethylaminetrichloro-N-methylpyridone. |
| 27 | n-Butylamine | do | n-Butylaminotrichloro-N-methylpyridone. |
| 28 | Cyclohexylamine | do | Cyclohexylaminotrichloro-N-methylpyridone. |
| 29 | Aniline | do | Anilinotrichloro-N-methylpyridone. |
| 30 | o-Toluidine | do | o-Toluidinotrichloro-N-methylpyridone. |
| 31 | p-Chloroaniline | do | p-Chloroanilinetrichloro-N-methylpyridone. |
| 32 | Methoxyethylamine | N-methyl-tetrabromo-2-pyridone | (Methoxyethylamino)tribromo-N-methyl-2-pyridone. |
| 33 | Methylamine | N-ethyltetrachloro-2-pyridone | (Methylamino)trichloro-N-ethyl-2-pyridone. |
| 34 | Ethylamine | do | (Ethylamino)trichloro-N-ethyl-2-pyridone. |
| 35 | Octylamine | do | (Octylamino)trichloro-N-ethyl-2-pyridone. |
| 36 | Allylamine | do | (Allylamino)trichloro-N-ethyl-2-pyridone. |
| 37 | Diallylamine | N-cyclohexyltetrachloropyridone | (Diallylamino)trichloro-N-cyclohexyl-2-pyridone. |
| 38 | Piperidine | do | Piperidinotrichloro-N-cyclohexyl-2-pyridone. |
| 39 | Pyrrolidine | do | Pyrrolidinotrichloro-N-cyclohexyl-2-pyridone. |
| 40 | p-Tert-butylaniline | do | (p-Tert-butylamino)trichloro-N-cyclohexyl-2-pyridone. |
| 41 | α-Naphthylamine | do | (α-Naphthylamino)trichloro-N-cyclohexyl-2-pyridone. |
| 42 | Aniline | N-allyltetrachloro-2-pyridone | Anilinotrichloro-N-allyl-2-pyridone. |
| 43 | Isobutylamine | N-α-naphthyltetrachloro-2-pyridone | (Isobutylamino)trichloro-N-α-naphthyl-2-pyridone. |
| 44 | Sec-butylamine | N-benzyltetrachloro-2-pyridone | (Sec-butylamino)trichloro-N-benzyl-2-pyridone. |
| 5 | Tert-amylamine | N-p-tolyltetrachloro-2-pyridone | (Tert-amylamino)trichloro-N-p-tolyl-2-pyridone. |
| 46 | Ethoxyethylamine | N-ethoxyethyltetrachloro-2-pyridone | (Ethoxyethylamino)trichloro-N-ethoxy-ethyl-2-pyridone. |
| 47 | o-Methylhydroxylamine | Tetrachloro-2-pyridone | (o-Methylhydroxylamino)trichloro-2-pyridone. |
| 48 | Morpholine | do | Morpholinotrichloro-2-pyridone. |
| 49 | Cyclohexylamine | do | (Cyclohexylamino)trichloro-2-pyridone. |
| 50 | Cyclooctylamine | N-methyltetrabromo-2-pyridone | (Cyclooctylamino)tribromo-N-methyl-2-pyridone. |

In a similar manner, other diaminodihalo-2-pyridones are produced by reaction of 4 molar equivalents of an amine with 1 molar equivalent of a tetrahalopyridone, as follows:

| Example | Amine | Pyridone | Product |
|---|---|---|---|
| 51 | Methylamine | N-methyltetrachloro-2-pyridone | Di(methylamino)dichloro-N-methyl-2-pyridone. |
| 52 | Ethylamine | N-isopropyltetrachloro-2-pyridone | Di(ethylamino)dichloro-N-isopropyl-2-pyridone. |
| 53 | Diallylamine | do | Di(diallylamino)dichloro-N-isopropyl-2-pyridone. |
| 54 | N-methyl-N-butylamine | N-cyclohexyltetrachloro-2-pyridone | Di(N-methyl-N-butyl-amino)dichloro-N-cyclohexyl-2-pyridone. |
| 55 | N-methylaniline | Tetrachloro-2-pyridone | Di(N-methylanilino)dichloro-2-pyridone. |
| 56 | Aniline | do | Dianilinodichloro-2-pyridone. |
| 57 | Isopropylamine | do | Di(isopropylamino)dichloro-2-pyridone. |
| 58 | Cyclohexylamine | N-phenylchloro-2-pyridone | Di(cyclohexylamino)dichloro-N-phenyl-2-pyridone. |
| 59 | Ammonia | do | Diaminodichloro-N-phenyl-2-pyridone. |

In a similar manner to Examples 24–59, but using equal and consecutive added amounts of two different amines, the following further products are prepared:

water to 10–100 gallons and sprayed at the rate of 5 pounds of active ingredient per acre onto a population of buttonweed to obtain control of weed growth.

| Example | Amines Used | Pyridone | Product |
|---|---|---|---|
| 60 | Ethylamine, then isopropylamine | N-ethyltetrachloro-2-pyridone | (Ethylamino)(isopropylamino)dichloro-N-ethyl-2-pyridone. |
| 61 | Methylamine, then ammonia | Tetrachloro-2-pyridone | Amino(methylamino)dichloro-2-pyridone. |
| 62 | Cyclohexylamine, then ammonia | N-phenyltetrabromo-2-pyridone | Amino(cyclohexylamino)dibromo-2-pyridone. |

Herbicidal activity typical of the products of the invention is shown by the following examples.

*Example 63*

A plot containing vigorously growing ryegrass, cucumber, millet, and cabbage was sprayed at the rate of 4 pounds per acre with aminotrichloro-N-phenyl-2-pyridone in aqueous dispersion. Within one week, the millet and cabbage were killed, whereas the ryegrass and cucumber were essentially uninjured, indicating selective herbicidal activity.

*Example 64*

A plot containing vigorously growing millet, tomato, cabbage, and cucumber plants was sprayed with an aqueous dispersion of (methylamino) trichloro-2-pyridone at the rate of 4 pounds per acre. Within two weeks, all the sprayed plants were killed.

*Example 65*

A wettable powder formulation was prepared by grinding together the following ingredients:

| | Parts by weight |
|---|---|
| Di(ethylamino)dichloro-N-ethylpyridone | 25 |
| Ligninsulfonic acid sodium salt (dispersing agent) | 3 |
| Sodium alkylnaphthalenesulfonate (wetting agent) | 2 |
| Attapulgus clay | 70 |

*Example 66*

An emulsifiable formulation was prepared by blending the following ingredients:

| | Pounds |
|---|---|
| Isopropylamino - dichloro - N - n - butyl - 2 - pyridone | 2 |
| Blended ionic/nonionic emulsifier (Toximul SR) | 0.05 |
| Isophorone-xylene (1:2 mixture) to 1 gallon total volume. | |

*Example 67*

A granular formulation was prepared by impregnating 9 parts by weight of 15–30 mesh granular clay with 1 part by weight of n-propylaminotrichloro-N-n-isopropyl-2-pyridone, using acetone as solvent for the latter and subsequently drying the granules at 80° C.

The products of Examples 65–67 are employed as post-emergent herbicides and are effective against a variety of common weeds. They are also useful as plant defoliants.

*Example 68*

A blend of the following ingredients is made:

| | Pound |
|---|---|
| 5,6 - tetramethylene - 3 (or 4) - bromo - 2 - pyridone | 1 |
| Toximul SR blend (blended polyoxyethylene-ether non-ionic emulsifier with an alkylarylsulfonate emulsifier) | 0.5 |
| Isophorone-xylene (1:1 mixture) to 1 gallon. | |

This emulsifiable concentrate (1 gallon) is diluted with

*Example 69*

The following ingredients are blended and ground in a hammer mill:

| | Parts by weight |
|---|---|
| 3,4 - dichloro - 5,6 - benzo - 2 - pyridone | 50 |
| Sodium lignosulfonate (dispersing agent) | 5 |
| Sodium alkylnaphthalenesulfonate (wetting agent) | 3 |
| Microcel E (calcium silicate) | 42 |

The resultant formulation is dispersed in water and sprayed at the rate of twenty pounds of active ingredient per acre onto a crabgrass-infested turf before crabgrass emergence to obtain crabgrass control without turf injury.

*Example 70*

A solution of 1 pound of 6-methoxy-3,4,5-trichloro-2-pyridone in acetone is sprayed onto 9 pounds of 12–24 mesh granulated attapulgus clay while tumbling the clay, then the mixture is dried to obtain a free-flowing 10% active granular formulation.

This formulation is applied at the rate of 200 pounds per acre to a crabgrass-infested turf before crabgrass emergence to obtain crabgrass control without turf injury.

*Example 71*

A granular formulation made as above, but containing 10% by weight of 2-methoxy-4-(ethylamino)-3,5-dichloro-2-pyridone is applied pre-emergence at the rate of 100 pounds per acre to an area infested with ragweed, to obtain a high degree of ragweed control.

The present invention has been described with respect to illustrations thereof but elements thereof may be altered and equivalents may be substituted therein without departing from the invention or going beyond the purview of the claims.

What is claimed is:

1. A method for repressing plant growth which comprises applying to a site of plant growth a growth-repressing quantity of a compound of the formula

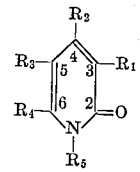

wherein $R_1$, $R_2$, $R_3$, and $R_4$ are selected from the group consisting of halogen, hydrogen, lower hydrocarbyl, lower hydrocarbyloxy, hydroxy, amino, lower hydrocarbylamino, nitro, carboxyl, carboxymethyl, and, in the case of adjacent members of the group of $R_1$, $R_2$, $R_3$ and $R_4$, the termini of a fused carbocyclic ring containing a total of from 5 to 8 carbon atoms, at least one of $R_1$, $R_2$, $R_3$ and $R_4$ is halogen and wherein $R_5$ is selected from the group consisting of hydrogen, a metal cation, an ammonium cation, lower hydrocarbyl ammonium and a lower acyl group and, whe nat least one of $R_1$, $R_2$, $R_3$ and $R_4$ is amino or lower hydrocarbyl amino, lower hydrocarbyl.

2. A method for destroying weeds which comprises applying to the weeds a herbicidal quantity of a compound of the formula

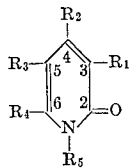

wherein $R_1$, $R_2$, $R_3$, and $R_4$ are selected from the group consisting of halogen, hydrogen, lower hydrocarbyl, lower hydrocarbyloxy, hydroxy, amino, lower hydrocarbylamino, nitro carboxyl, carboxymethyl, and, in the case of adjacent members of the group of $R_1$, $R_2$, $R_3$ and $R_4$, the termini of a fused carbocyclic ring containing a total of from 5 to 8 carbon atoms, at least one of $R_1$, $R_2$, $R_3$ and $R_4$ is halogen and wherein $R_5$ is selected from the group consisting of hydrogen, a metal cation, an ammonium cation, lower hydrocarbyl ammonium, and a lower acyl group and, when at least one of $R_1$, $R_2$, $R_3$ and $R_4$ is amino or lower hydrocarbyl amino, lower hydrocarbyl.

3. The method of claim 1 wherein the 2-pyridone is applied at a rate of one-eighth to 100 pounds per acre.

4. The method of claim 2 wherein the 2-pyridone is applied at a rate of one-quarter to 50 pounds per acre.

5. A method for repressing plant growth which comprises applying to a site of plant growth a growth-controlling quantity of a compound selected from the group consisting of 3,4,5,6-tetrahalo-α-pyridone and the water soluble ionizable salts thereof, which salts may form 3,4,5,6-tetrahalo-α-pyridone in the environment of the site of the plant growth.

6. A method for repressing plant growth which comprises applying to a site of plant growth a phytotoxic quantity of 3,4,5,6-tetrachloro-α-pyridone.

7. A method for repressing plant growth which comprises applying to a site of plant growth a phytotoxic quantity of an alkaline earth metal salt of 3,4,5,6-tetrahalo-α-pyridone.

8. A method for defoliating and desiccating foliage of crops which comprises applying to a site of said crop a defoliating quantity of a compound selected from the group consisting of 3,4,5,6-tetrahalo-α-pyridone and the water soluble ionizable salts thereof, which salts may form 3,4,5,6-tetrahalo-α-pyridone in the environment of the site of the crop.

9. A method for controlling plant growth which comprises applying to a site of plant growth a phytotoxic quantity of an alkali metal salt of 3,4,5,6-tetrahalo-α-pyridone.

10. A method for controlling plant growth which comprises applying to a site of plant growth a phytotoxic quantity of an ammonium salt of 3,4,5,6-tetrahalo-α-pyridone.

11. A method for controlling plant growth which comprises applying to a site of plant growth a phytotoxic quantity of a lower alkyl substituted amine salt of 3,4,5,6-tetrahalo-α-pyridone.

12. A method for repressing plant growth which comprises applying to a site of plant growth a growth-repressing quantity of a compound of the formula

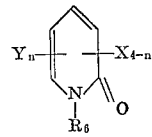

wherein X is halogen, Y is amino or lower hydrocarbyl amino, $n$ is an integer from 1 to 2 inclusive and $R_6$ is selected from the group consisting of hydrogen and hydrocarbyl radical.

13. A method for repressing plant growth which comprises applying to a site of plant growth a growth-repressing quantity of a compound of the formula

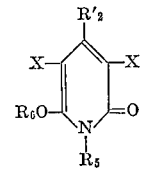

wherein $R'_2$ is lower hydrocarbylamino, X is halogen, $R_6$ is selected from the group consisting of hydrogen and lower hydrocarbyl and $R_5$ is selected from the group consisting of hydrogen, a metal cation, an ammonium cation, lower hydrocarbyl ammonium and a lower acyl group.

14. A method for repressing plant growth which comprises applying to a site of plant growth a growth-repressing quantity of a compound of the formula

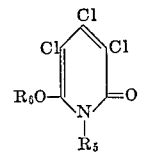

wherein $R_5$ is selected from the group consisting of hydrogen, a metal cation, an ammonium cation, lower hydrocarbyl ammonium and a lower acyl group, and $R_6$ is selected from the group consisting of hydrogen and hydrocarbyl.

15. A method for destroying weeds which comprises applying to the foliage of said weeds a weed destroying quantity of a compound of the formula

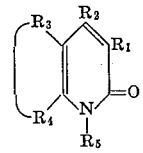

$R_1$ and $R_2$ are selected from the group consisting of halogen, hydrogen, lower hydrocarbyl, lower hydrocarbyloxy, hydroxy, amino, lower hydrocarbylamino, nitro, carboxyl, carboxymethyl, and, when adjacent, are the termini of a fused carbocyclic ring containing a total of from 5 to 8 carbon atoms, at least one of $R_1$ and $R_2$ is halogen, $R_5$ is selected from the group consisting of hydrogen, a metal cation, an ammonium cation, lower hydrocarbyl ammonium and a lower acyl group, and $R_3$ and $R_4$, taken together, form a carbocyclic bridge of from 3 to 6 carbon atoms.

16. A method for destroying weeds which comprises applying to the weeds a herbicidal quantity of aminotrichloro-N-phenyl-2-pyridone.

17. A method for destroying weeds which comprises applying to the weeds a herbicidal quantity of (methylamino) trichloro-2-pyridone.

18. A method for destroying weeds which comprises applying to the weeds a herbicidal quantity of di(ethylamino)dichloro-N-ethylpyridone.

19. A herbicidal composition comprising a herbicidal proportion of a compound of the formula

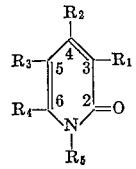

wherein $R_1$, $R_2$, $R_3$, and $R_4$ are selected from the group consisting of halogen, hydrogen, lower hydrocarbyl, lower hydrocarbyloxy, hydroxy, amino, lower hydrocarbylamino, nitro carboxyl, carboxymethyl, and, in the case of adjacent members of the group of $R_1$, $R_2$, $R_3$ and $R_4$, the termini of a fused carbocyclic ring containing a total of from 5 to 8 carbon atoms, at least one of $R_1$, $R_2$, $R_3$ and $R_4$ is halogen and wherein $R_5$ is selected from the group consisting of hydrogen, a metal cation, an ammonium cation, lower hydrocarbyl ammonium, and a lower acyl group and, when at least one of $R_1$, $R_2$, $R_3$ and $R_4$ is amino or lower hydrocarbyl amino; a carrier and a surface active agent.

References Cited

Dohrn et al.: Chemical Abstract, volume 23, 2189 (1929).

Heath et al.: Chemical Abstract, volume 51, 2947h (1957).

Yokoyama Chemical Abstract, volume 30, 5204 (1936).

LEWIS GOTTS, *Primary Examiner.*

JAMES O. THOMAS, JR., ELBERT L. ROBERTS, *Examiners.*

A. J. ADAMCIK, *Assistant Examiner.*